United States Patent Office 3,143,232
Patented Aug. 4, 1964

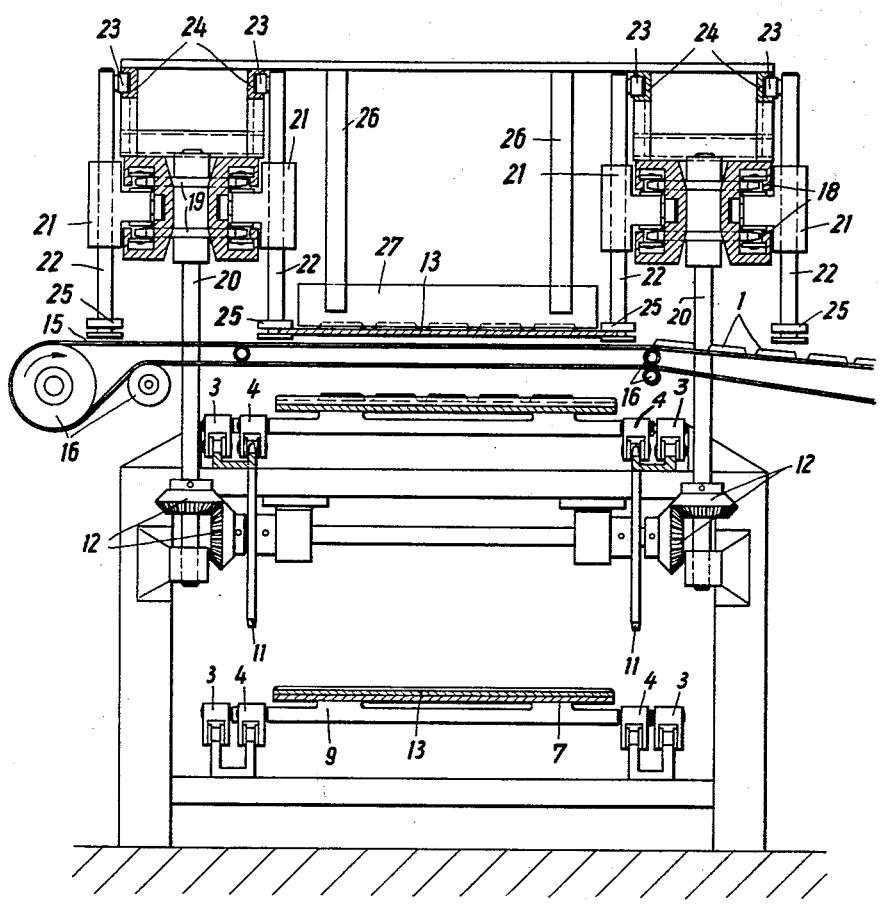

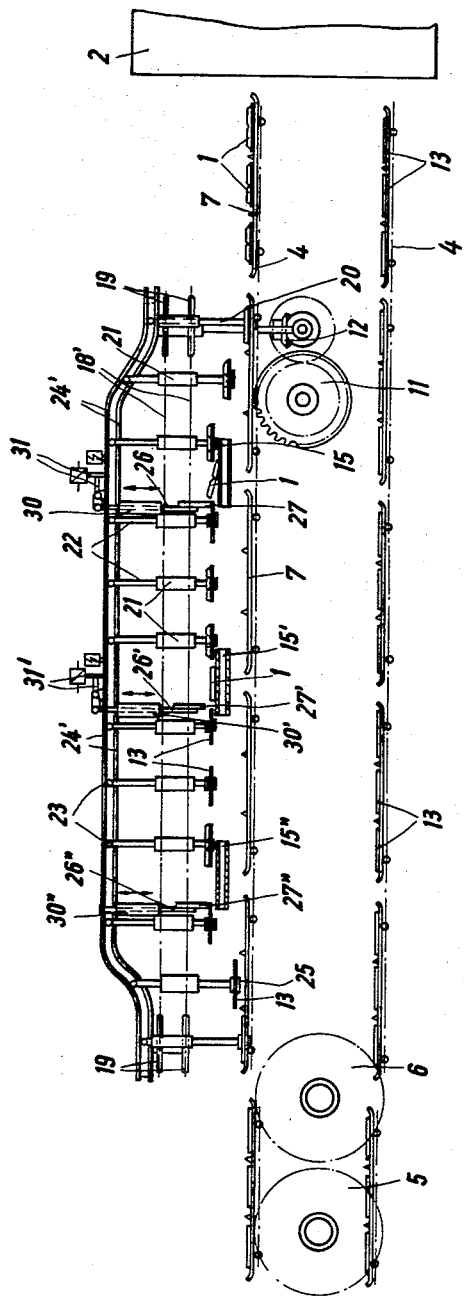

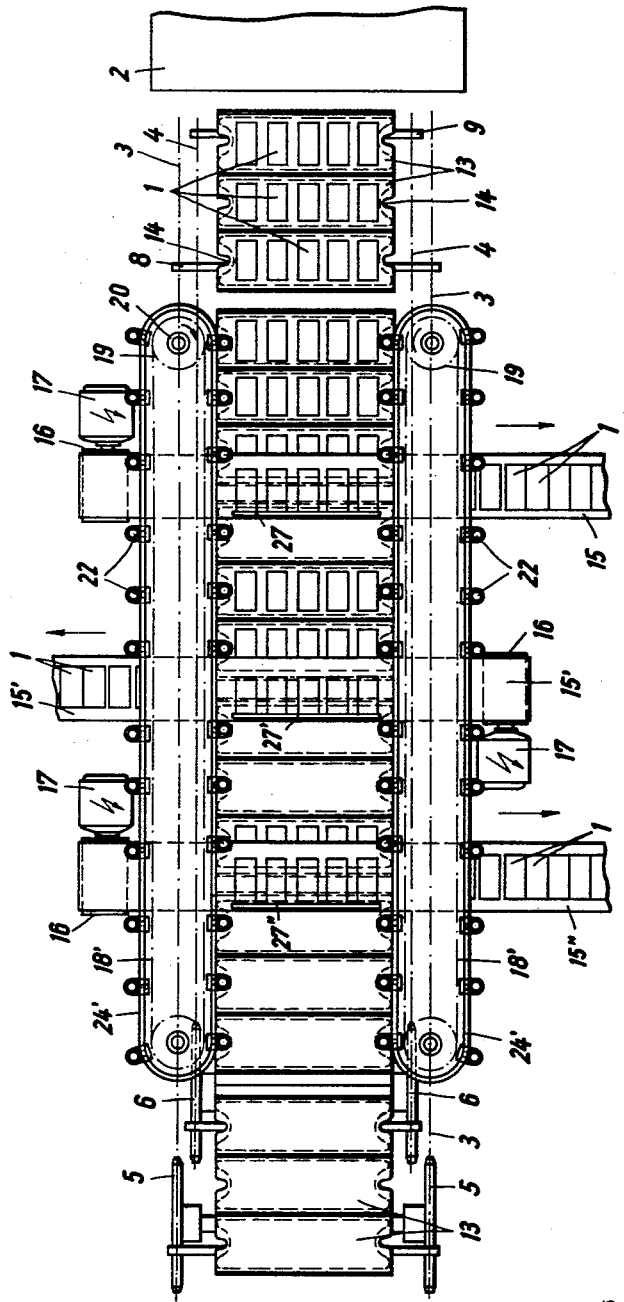

3,143,232
APPARATUS FOR TRANSFERRING CHOCOLATE BARS OR THE LIKE FROM ONE CONVEYING SYSTEM TO ANOTHER
Otto Hänsel, Jr., Hannover, and Hans Lesch, Hannover-Kirchrode, Germany, assignors to Otto Hansel Junior G.m.b.H., Hannover, Germany, a corporation of Germany
Filed Aug. 17, 1960, Ser. No. 50,273
6 Claims. (Cl. 214—310)

The present invention relates to an apparatus for transferring chocolate bars, tablets, or the like from a main conveyor means, on which they arrive in successive cross-rows, to one or more branch conveyors feeding the bars, in a single row one after the other to a packing machine or to a stacking apparatus, for instance.

With particular advantage, the present will be used to feed chocolate bars coming from a cooling chamber or a pouring apparatus to several packing machines.

Known devices of this type have disadvantages, in so far as they operate intermittently and their adaptability to different types, sizes, and shapes of chocolate bars, tablets, or the like is limited. Furthermore, the chocolate bars leave the cooling chamber continuously in four to ten cross-rows, while the packing machine can only receive and process the bars one after the other. With these machines, it is difficult to cope with the great number of bars to be distributed uniformly and rapidly to different packing machines.

In known devices which employ scrapers only, the chocolate bars were also subjected to high mechanical stress which resulted in a great number of chocolate bars being broken, and brought about an unbearable amount of waste.

It is, therefore, one object of the present invention to provide an apparatus for transferring chocolate bars or the like from one conveying system to another, which eliminates the above described deficiencies by providing plates, sheets, or the like to carry the chocolate bars, and a lifting device and discharge means at the intersection of the different conveying systems, the lifting device picking up the plates with the chocolate bars coming in on the main conveyor, raising them over the branch conveyor, scraping them off the plates and returning the empty plates to the main conveyor to be returned to the pouring apparatus.

It is another object of the present invention to provide an apparatus for transferring chocolate bars or the like from one conveying system to another, wherein according to operating requirements, one or more branch conveyors may be provided for one main conveyor, and each branch conveyor having its own lifting device. All conveying means, as well as the lifting device and the discharge means operate continuously, so that the chocolate bars are not subjected to impact stress. Preferably, the lifting device consists of endless chains, arranged near the intersection of the conveying systems on both sides of the main conveyor to rotate about vertical axes, and mounting lifting members moved up and down by additional control means to seize and pick up the plates with the chocolate bars arriving on the main conveyor and discharge them above the branch conveyor. For the latter purpose, a stationary scraper or the like is provided above the branch conveyor. It is of particular advantage to arrange several branch conveyors above the main conveyor which cross the latter, and to provide a common plate lifting device which bridges all of the branch conveyors, while a discharge means is fitted above each branch conveyor and operated according to requirements.

It is still another object of the present invention to provide an apparatus for transferring chocolate bars or the like from one conveying system to another, wherein preferably, the lifting members are mounted to the chains forming the lifting device at intervals corresponding to those of the plates on the main conveyor, so that all plates are picked up from the main conveyor and passed across all of the branch conveyors. Depending on the adjustment of the associated discharge means, of a scraper for instance, the chocolate bars are scraped off or tipped off the plates above a predetermined branch conveyor, whereupon the empty plates are returned to the main conveyor. The discharge means may be formed of reversible scrapers. It is also possible to tilt the plates carrying the chocolate bars to an extent so that the row of bars slides off the inclined plate transverse to its longitudinal axis.

With these and other objects in view, which will become apparent in the following detailed description, the present invention will be clearly understood in connection with the accompanying drawings, in which:

FIG. 3 is a cross-section along the lines 3—3 of FIG. 1;

FIG. 4 is a side elevation of another embodiment of the present apparatus; and

FIG. 5 is a top plan view of the apparatus disclosed in FIG. 4.

Figure 1:
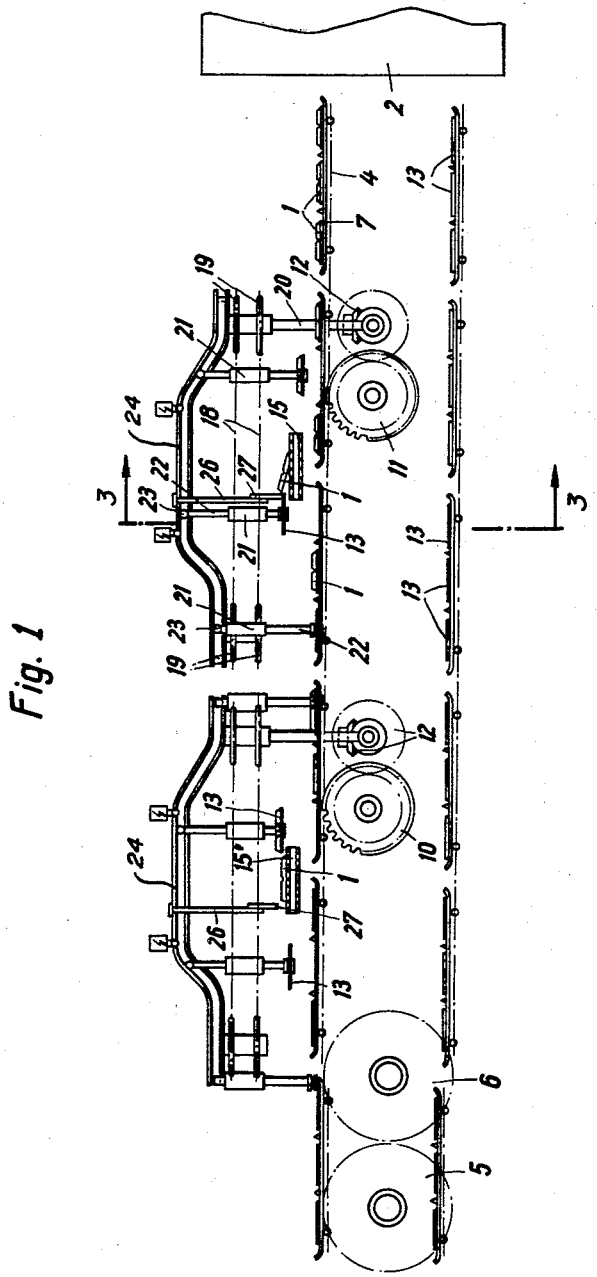
FIGURE 1 is a side elevational view of the present apparatus.
Figure 2:
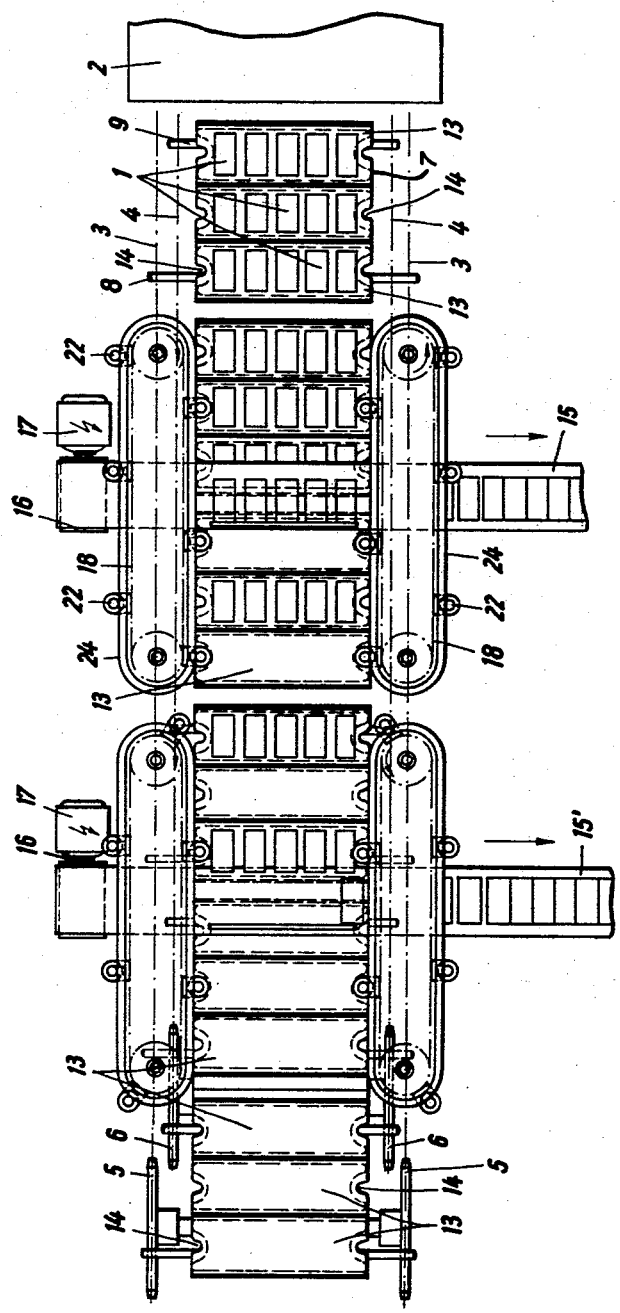
FIG. 2 is a top plan view of the apparatus shown in FIG. 1.

Referring now to the drawings, and in particular to FIGS. 1 to 3, the main conveying means which, for instance, takes the chocolate bars 1 out of a cooling chamber 2, comprises substantially two endless conveying chains 3 and 4 passing over guide wheels 5 and 6. Frames 7, which transport the chocolate bars 1, have longer support arms 8 resting on the chains 3 and shorter support arms 9 resting on the chains 4, so that upon rotation of both chains 3 and 4, the frames 7 are maintained in their horizontal position. The chains 3 and 4 are continuously driven by sprockets 10 and 11 which also drive, through means of an intermediate gearing, a lifting device which will be described below.

According to the present invention, the chocolate bars 1 are transported in form of cross-rows, each of the latter having five bars (FIG. 2), and each row of five bars being carried by a plate 13 having a recess 14 at each narrow side. In the embodiment shown in FIGS. 1 to 3, three plates 13 rest on a common frame 7.

For the main conveying means comprising the two endless chains 3 and 4, two branch conveyors 15 and 15' are provided in the embodiment disclosed in FIGS. 1 to 3. The two branch conveyors 15 and 15' pass over guide rollers 16 and are disposed above the main conveyor means. Both branch conveyors 15 and 15' have their own motor drive 17, and their speed is independent from each other and from the working speed of the main conveying means.

A separate lifting device to be described below, is provided for each of the branch conveyors 15 and 15'.

Above the main conveying means and its continuous conveying chains 3 and 4 and at both of its sides there are conveying chains 18, passing over sprocket wheels 19. A continuous drive of the conveying chains 18 is brought about by means of drive shafts 20 from gears 12. The conveying chains 18 move at the same speed as the chains 3 and 4 of the main conveying means. Guide bushings 21 are mounted spaced apart at predetermined distances, between the conveying chains 18 to receive vertically displaceable lifting members 22. At their upper end the lifting members 22 have rollers 23 to guide the lifting members 22 in a curved section 24 of an upper rail. The lower ends of the lifting members 22 form carrier discs 25 which are dimensioned and shaped to allow for the lifting members 22 to enter the lateral recesses 14 of the plates 13.

Above each of the branch conveyors 15 and 15' there is a scraper 27 mounted on an arm 26 in a position to permit cooperation with the upward movement of the lifting members 22 and to scrape the chocolate bars 1 off the plates 13.

The operation of the present apparatus is performed in the following manner:

The chocolate bars 1 form successive cross rows on the plates 13 on the main conveyor belt and eventually reach the lifting device which moves in the same direction and at the same speed. According to FIG. 2, the lifting members 22 and their carrier discs 25 enter the recesses 14 of one plate 13, so that the plate 13 is securely held between two oppositely disposed lifting members 22. During the simultaneous movemen of the lifting members 22 and the plates 13 on the endless conveying chains of the advancing main conveyor 3 and 4, the guide rollers 23 roll along in the curved sections 24 of the upper rail, so that in addition to the horizontal movement the lifting members 22 are also caused to move vertically. Together with the chocodate bars 1 on the plates 13 held between two cooperating lifting members 22, the plates 13 are raised over the branch conveyor 15. Here, the crossrow of chocolate bars 1 moves against the stationary scraper 27, whereby the first crossrow of chocolate bars is scraped off the plates 13 onto the branch conveyor 15, as illustrated in FIG. 1. The chocolate bars 1, now one behind the other, are carried away by the branch conveyor at predetermined speed. The curved section 24 of the rail then causes the lifting members 22 to lower again until the empty plate 13 is returned to the frame 7 on the main conveyor 3 and 4, at which moment the lifting members 22, at the end of their conveyor chains 18, are moved away from the plates 13.

When using two branch conveyors 15 and 15', the lifting devices and the lifting members on the conveyor chains are arranged in such manner that the first lifting device alternately picks up a plate with its chocolate bars and leaves the next one on the main conveyor 3 and 4. The lifting members 22 of the second lifting device are displaced relative to the lifting members of the first lifting device, so that the second lifting device in the series only picks up the plate left on the main conveyor by the first lifting device. In case of more than two branch conveyors being provided, the lifting members are displaced accordingly.

Referring now again to the drawings, and in particular to FIGS. 4 and 5, another embodiment of the present invention is disclosed, wherein three branch conveyors 15, 15, 15" pass over the main conveyor 3 and 4, bridged by a lifting device common to all of them.

The conveyor chains 18' of the lifting device are provided with a plurality of lifting members 22, guided in a curved section 24' of the rail, so that each plate is picked up from the main conveyor 3 and 4 and forwarded to the branch conveyors 15, 15' and 15".

At the side of each branch conveyor 15, 15' and 15" there is a scraper 27, 27' and 27", respectively, mounted on arms 26, 26' and 26", which slide vertically in stationary bushings 30, 30' and 30", respectively, and the arms 26 and 26' are operated by suitable control means 31 and 31'. The control device 31' is provided for the conveyor 15'. The scraper 27" for the last branch conveyor 15" may be rigidly mounted in the bushing 30". It is arranged at a height to scrape the chocolate bars off the plates 13 and transfer them to the branch conveyor 15".

The control means 31 and 31' may be electrically or electromechanically operated and synchronized, so that only the associated scraper 27 or 27' is lowered at predetermined intervals to bring about the transfer to the associated branch conveyor 15 or 15' the row of chocolate bars 1, which are just located between the lifting members passing across the correspondent branch conveyor. It is to be understood that by timing the control and drive means 31 and 31' accordingly, only predetermined rows of chocolate bars 1, are transferred to the different branch conveyors 15, 15' and 15". The operation and the cycle of operation of the control means are adjustable as may be desired.

It is also possible to feed more than three branch conveyors in the same way. It is only necessary to extend the lifting device accordingly and to provide more control means. If desired, the distances between the branch conveyors 15, 15' and 15" can be varied to adapt the machine and its working cycle to special operating conditions. In this case, the guide wheels 16 for the branch conveyors 15 and their drives 17 should be adjustable.

In this way, chocolate bars of different size, or type, or shape which arrive on the main conveyor in a predetermined sequence, can be supplied via predetermined branch conveyors to associated packing stations. Thus, automatic sorting and distribution of the different types of chocolate bars to the different associated processing stations is achieved. Since continuous operation is secured, the operating speed can be considerably increased as compared to conventional machines.

While we have disclosed several embodiments of the present invention, it is to be understood that these embodiments are given by example only and not in a limiting sense, the scope of the present invention being determined by the objects and the claims.

We claim:
1. A distributor for chocolate bars, tablets, or the like comprising
    a first conveyor including endless chains mounted to move in a vertical plane and adapted to support a plurality of chocolate bars disposed crosswise on said first conveyor,
    a second conveyor including conveying chains disposed adjacent to and moving in the direction of movement of said first conveyor in a horizontal plane extending perpendicularly to the plane of movement of said first conveyor,
    at least one third conveyor disposed crosswise to and between said first and said second conveyors,
    a plurality of plates removably carried by said first conveyor,
    each of said plates supporting one of said chocolate bars,
    means for moving said first conveyor at a speed identical with that of said second conveyor,
    lifting members operatively connected with and moving with said second conveyor,
    means for raising and lowering, respectively, said lifting members during their travel with said second conveyor,
    means for interlocking said lifting members with said plates during the travel of said first and second conveyors, in order to lift said plates from said first conveyor to a level above said third conveyor,
    abutment means disposed adjacent to said third conveyor and within the path of said chocolate bars during the lifted position of the latter and moving said cholocate bars from said lifted plates onto said third conveyor to be received thereon longitudinally in a single line, and
    said lifting members, upon lowering the latter to the level of said first conveyor during their continued travel with said second conveyor, depositing again said plates onto said first conveyor.

2. The distributor, as set forth in claim 1, which includes
    means for continuous operation of said first, second and third conveyors.

3. The distributor, as set forth in claim 1, wherein said means for raising and lowering said lifting members comprise rails disposed at a level higher than that of said second conveyor and having raised curved sections guiding said lifting members from a normal lower position to a raised position.

4. The distributor, as set forth in claim 1, which includes
a plurality of said third conveyors disposed substantially parallel relative to each other and moving in opposite directions in relation to the adjacent third conveyors, and each of said third conveyors receiving said chocolate bars from predetermined plates on said second conveyor.

5. The distributor, as set forth in claim 1, wherein said lifting members having rollers at their upper end, and
guide means for said rollers to guide said lifting members into predetermined level positions.

6. The distributor, as set forth in claim 1, which includes
a plurality of said third conveyors spaced apart from each other at a predetermined distance coordinated to the spacing of said abutment means.

References Cited in the file of this patent

UNITED STATES PATENTS

| | | |
|---|---|---|
| 2,611,493 | Nordquist | Sept. 23, 1952 |
| 2,625,284 | Atwood | Jan. 13, 1953 |
| 2,636,625 | Pries | Apr. 28, 1953 |
| 2,816,643 | Klamp | Dec. 17, 1957 |
| 2,927,707 | Reed et al. | Mar. 8, 1960 |